United States Patent
Tanaka et al.

(10) Patent No.: US 6,919,822 B2
(45) Date of Patent: Jul. 19, 2005

(54) PARKING ASSIST DEVICE AND METHOD FOR ASSISTING PARKING

(75) Inventors: Yuu Tanaka, Kariya (JP); Yoshifumi Iwata, Anjo (JP); Tomohiko Endo, Toyota (JP); Hisashi Satonaka, Susono (JP); Mitsuhiko Morita, Shizuoka-ken (JP); Seiji Kawakami, Susono (JP); Katsuhiko Iwazaki, Shizuoka-ken (JP); Hiroaki Kataoka, Susono (JP)

(73) Assignee: Aisin Seiki Kabushiki Kaisha, Kariya (JP)

(*) Notice: Subject to any disclaimer, the term of this patent is extended or adjusted under 35 U.S.C. 154(b) by 96 days.

(21) Appl. No.: 10/349,095

(22) Filed: Jan. 23, 2003

(65) Prior Publication Data

US 2003/0156045 A1 Aug. 21, 2003

(30) Foreign Application Priority Data

Jan. 23, 2002 (JP) ........................................ 2002-014794

(51) Int. Cl.$^7$ ................................................ B60Q 1/48
(52) U.S. Cl. .................... 340/932.2; 340/903; 340/436; 340/437; 340/438; 701/1; 701/41; 701/36; 701/300; 701/310; 701/302
(58) Field of Search ............................. 340/932.2, 903, 340/436, 437, 438; 701/1, 41, 36, 300, 310, 302

(56) References Cited

U.S. PATENT DOCUMENTS

| | | | | |
|---|---|---|---|---|
| 6,483,442 B2 | * | 11/2002 | Shimizu et al. | 340/932.2 |
| 6,564,123 B2 | * | 5/2003 | Hahn et al. | 701/1 |
| 6,621,421 B2 | * | 9/2003 | Kuriya et al. | 340/932.2 |
| 6,654,670 B2 | * | 11/2003 | Kakinami et al. | 701/1 |

FOREIGN PATENT DOCUMENTS

| | | |
|---|---|---|
| JP | 11-208420 | 8/1999 |
| JP | 2000-72019 A | 3/2000 |

* cited by examiner

*Primary Examiner*—Tai T. Nguyen
(74) *Attorney, Agent, or Firm*—Burns, Doane, Swecker & Mathis, LLP

(57) ABSTRACT

According to a parking assist device and a method for assisting parking of the invention, when a parking assist is canceled after a start of the parking assist, and the parking assist is restarted, a target parking position (P2B) is reset at a reset position (P1B). In the invention, at this time, the target parking position (P2B) is determined based on a target parking position (P2A) which is set at a parking preparation position (P1A), and the determined target parking position (P2B) is displayed on a screen of a monitor (4) as a default display position of a target parking frame (11) at a reset time.

12 Claims, 6 Drawing Sheets

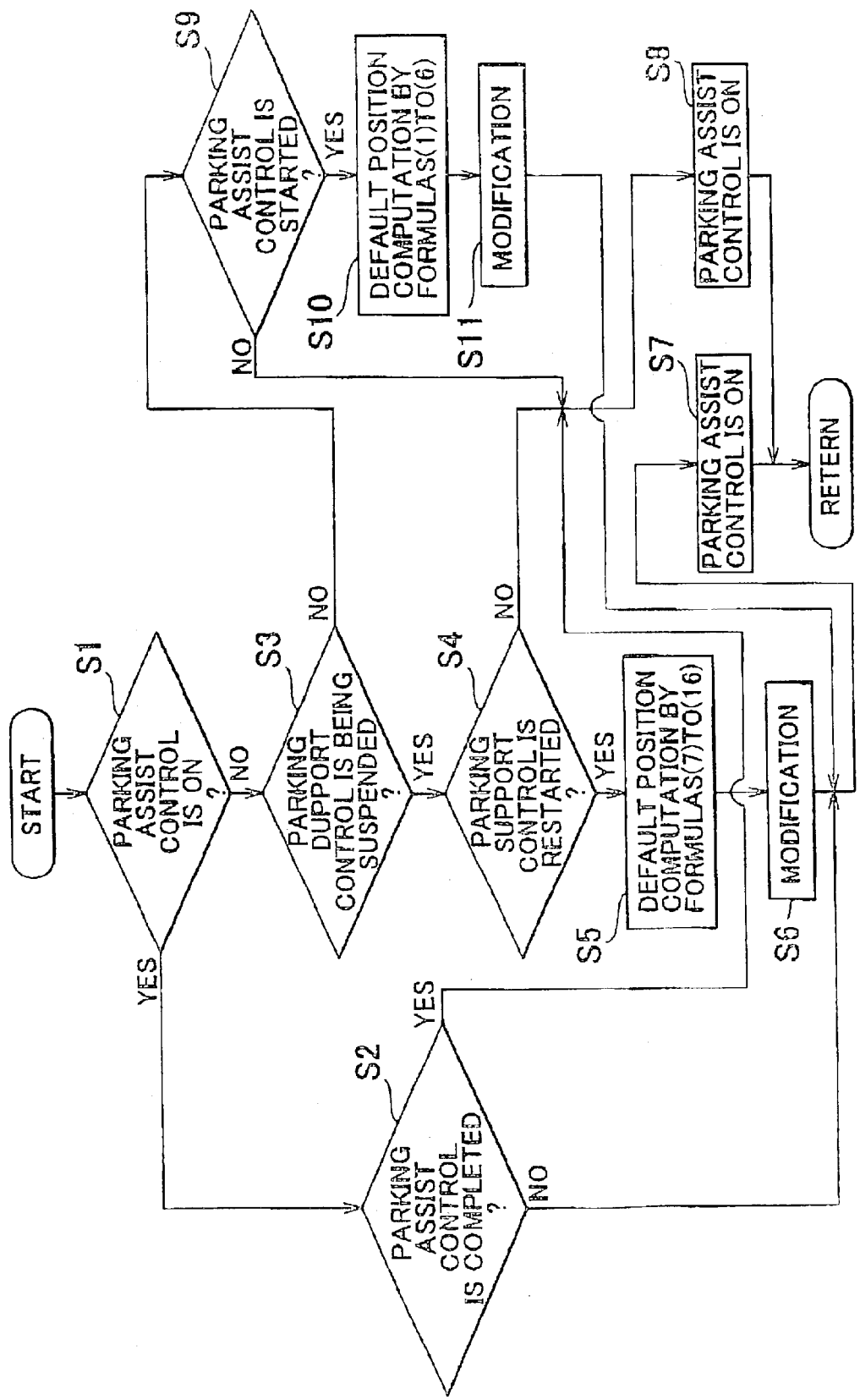

PARKING ASSIST DEVICE AND METHOD FOR ASSISTING PARKING

BACKGROUND OF THE INVENTION

1. Field of Invention

The invention relates to a parking assist device and a method for assisting parking.

2. Description of Related Art

When a driver operates a vehicle, it is relatively difficult to park a vehicle such as backing the vehicle into the garage and executing parallel parking. Especially, a beginning driver is likely to have difficulty in a vehicle operation at the time of parking the vehicle. Then, a parking assist device for assisting the operation at the time of parking the vehicle is known. As the parking assist device of this type, a parking guide device is disclosed in Japanese Patent Laid-Open Publication No. 11-208420. The parking guide device guides the vehicle to a target parking position by capturing a target parking area from a side of the target parking position and superimposing a target parking frame obtained by computation on the captured camera image.

However, in the parking guide device disclosed in the aforementioned publication, the parking assist may be canceled against the driver's will due to shock or the like which is caused when the vehicle runs onto a curbstone arranged in front of the garage after the parking assist is started. In such a case where the parking assist is canceled against the driver's will, the driver usually wants the parking assist to be restarted soon. However, in the parking guide device disclosed in the Publication, a moving route of the vehicle is determined only depending on a relative positional relation between a position of the vehicle at which the target parking area is captured from the side, and the target parking area. Therefore, once the parking assist is canceled, the vehicle needs to be moved to the side of the target parking position again, which takes a lot of trouble.

SUMMARY OF THE INVENTION

It is an object of the invention to make it possible to set a target parking position easily when parking assist is canceled because a vehicle stops or the like during the parking assist, and the parking assist is restarted. As a result, the parking assist can be restarted early.

A first aspect of the invention relates to a parking assist device which includes image capturing means for capturing an area outside the vehicle and displaying means for displaying a captured image, and displays a target parking frame on a screen of the displaying means to assist an operation of parking executed by a driver. When the parking assist is canceled after the start thereof, and then the parking assist is restarted, the parking assist device determines a target parking position at the restart time of parking assist based on a target parking position which is set prior to the restart time of the parking assist, and displays the target parking position at the restart time on a screen of the displaying means as a default display position (initial setting position) of the target parking frame at the reset time.

Therefore, a position corresponding to the target parking position or a position close to this may be the default display position of the target parking frame. Accordingly, when the target parking position is set, the target parking frame is not required to be moved considerably, which enables an easy setting of the target parking position and an early restart of the parking assist.

Also, it is preferable to determine the target parking position at the restart time of the parking assist by calculating a moving amount of the vehicle from when the target parking position is set prior to the restart of the parking assist until when the parking assist is restarted, and by moving the target position set prior to the restart time by the moving amount of the vehicle.

The default display position of the target parking frame at the reset time can be easily determined by setting the default display position of the target parking frame at the reset time in the above-mentioned manner.

Also, the target parking frame may be obtained based on the determined target parking position at the restart time, and the obtained target parking frame may be displayed as a default display on the screen.

In addition, it is preferable that the parking assist system is provided with restart judging means for judging whether a setting of the target parking position is for a restart of the parking to the target parking position which is set prior to the restart of the parking assist. If the setting of the target parking position is judged as for the restart of parking by the restart judging means, it is preferable to display the target parking frame obtained based on the target parking position at the restart time as the default display on the screen.

As mentioned above, the default display position of the target parking frame at the restart time of the parking assist can be easily set by providing the restart judging means.

Also, it is preferable to keep displaying the target parking frame on the screen of the displaying means during execution of the parking assist.

The driver can confirm the position at which the vehicle is to be parked with reliability by continuously displaying the target parking frame during the parking assist.

The parking assist device may include target parking position setting means for setting the target parking position by moving the target parking frame which is displayed on the screen on the displaying means. Accordingly, when the target parking frame is displaced from the target parking position at the restart time of the parking assist, the target parking frame can be easily corresponds to the target parking position by the target parking position setting means.

A second aspect of the invention relates to a method for assisting a parking operation by displaying an image captured by image capturing means of a vehicle and the target parking frame on a screen of displaying means provided inside the vehicle. In this method, when the parking assist is canceled after the start thereof, and the parking assist is restarted, the target parking position at the restart time is determined based on the target parking position which is set prior to the restart of the parking assist. Subsequently, the determined target parking position is displayed on the screen of the displaying means as the default display position of the target parking frame at the reset time.

BRIEF DESCRIPTION OF THE DRAWINGS

The forgoing and further objects, features and advantages of the invention will become apparent from the following description of preferred embodiment with reference to the accompanying drawings, wherein like numerals are used to represent like elements and wherein:

FIG. 6 is a flow chart showing an operation of the parking assist device according to the embodiment.

DETAILED DESCRIPTION OF PREFERRED EMBODIMENT

Hereafter, a preferred embodiment of the invention will be explained in detail with reference to accompanied drawings.

Figure 1:
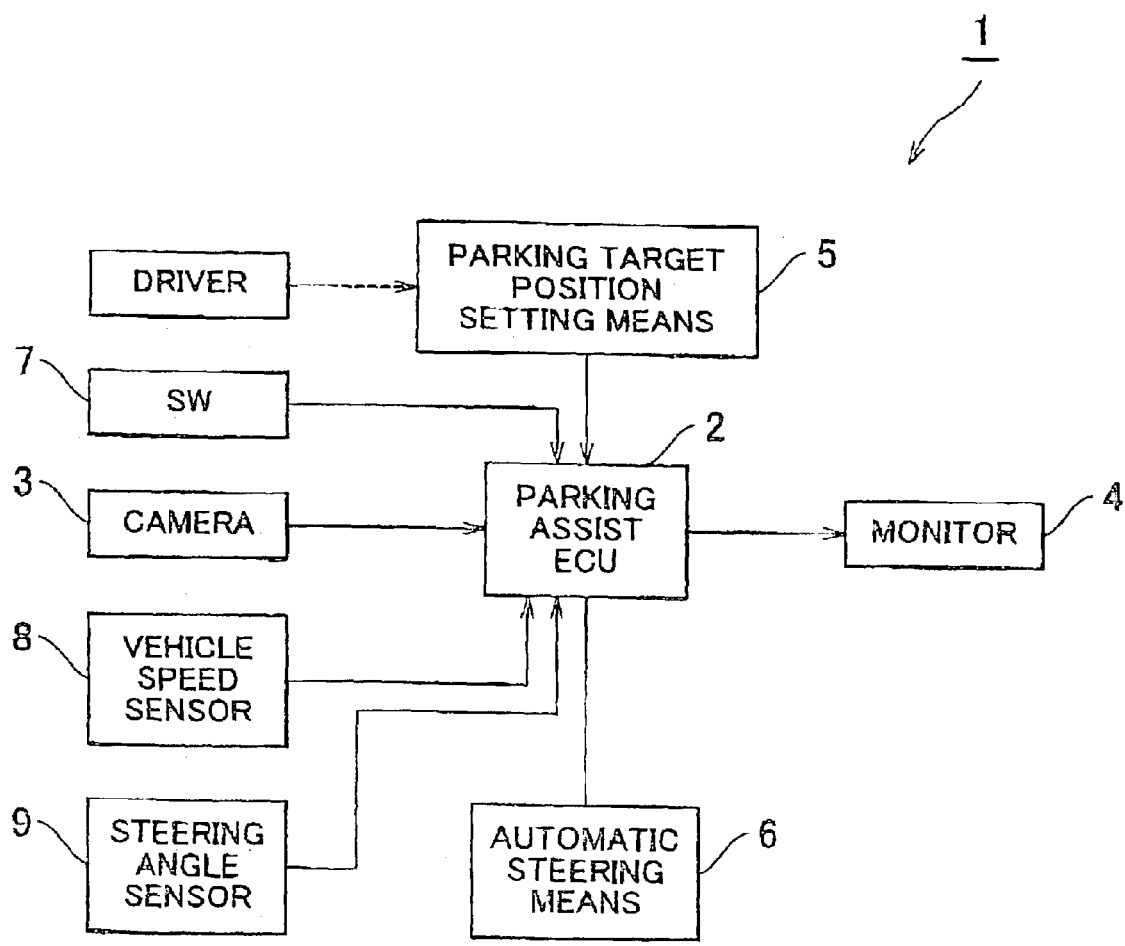
FIG. 1 is a block diagram showing a parking assist device according to an embodiment of the invention.

A parking assist device 1 according to the embodiment is mounted on a vehicle to execute parking assist when the vehicle is parked. As shown in FIG. 1, the parking assist device 1 includes a parking assist ECU 2, which is an electronic control unit. The parking assist ECU 2 controls the whole parking assist device 1. The parking assist ECU 2 is provided with a CPU, a ROM, a RAM, an input signal circuit, an output signal circuit, a power circuit, or the like, and stores various control routines including a parking assist control routine.

A camera 3, a monitor 4, and target parking position setting means 5 are connected to the parking assist ECU 2. The camera 3 can be regarded as image capturing means of the invention. The monitor 4 can be regarded as displaying means of the invention.

The camera 3 includes, for example, a wide-angle lens which is arranged in a rear portion or a side portion of the vehicle, and captures an image of an outside area in back of the vehicle. The image captured by the camera 3 is displayed on a screen of the monitor 4. The camera 3 may capture the image of the area in back of the vehicle at all the times, or may start capturing the image when the vehicle is backed up in order to reduce power consumption. Vehicle's backing up can be detected by, for example, a fact that a shift lever is placed in a reverse range.

Figure 2:
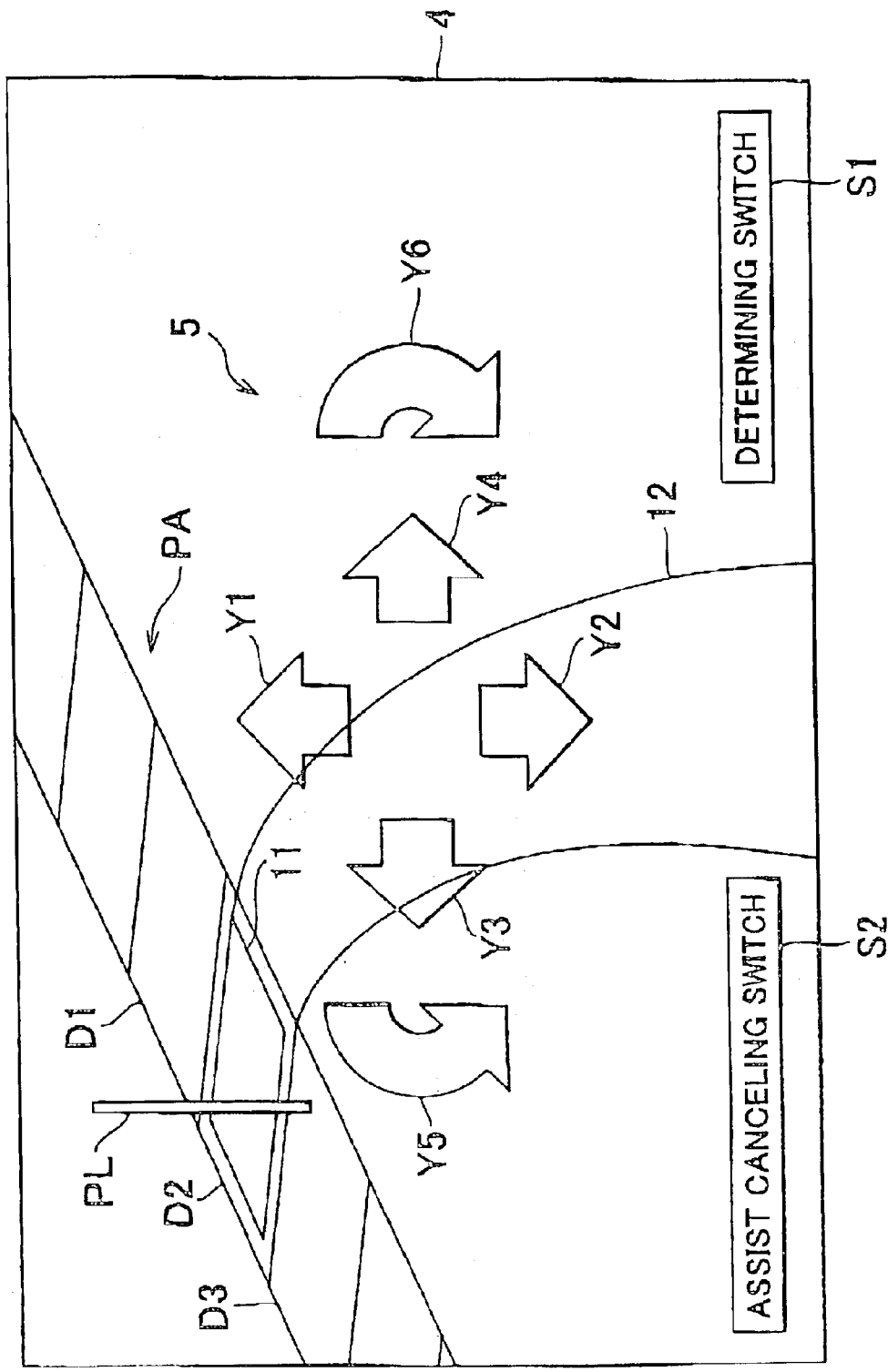
FIG. 2 is a diagram showing an image displayed on a monitor.

The monitor 4 is arranged at a position, for example, at a position which is within sight of the driver, in an instrument panel. As shown in FIG. 2, a target parking frame 11 which shows a target parking position displayed at a position determined by the parking assist ECU 2 in addition to the image captured by the camera 3 is displayed on the screen of the monitor 4.

As shown in FIG. 2, target parking position setting means 5 is a touch panel type and is displayed on a screen of the monitor 4, and includes arrows Y1 to Y4 in a vertical direction or a lateral direction, and rotational arrows Y5, Y6 which curve in a clockwise direction or a counterclockwise direction. By touching these arrows Y1 to Y6, a target parking frame 11 which is determined in advance, and also displayed on the screen of the monitor 4 along with the image captured by the camera 3 is rotated and moved to set the target parking position. Note that when a default position display of the target parking frame 11 corresponds to a position corresponding to the target parking position, the target parking position is set without the need for touching the arrows Y1 to Y6 of the target parking position setting means.

Also, a determining switch S1 which the driver touches when the driver judges that the default position display of the target parking frame 11 has corresponds to the position corresponding to the target parking position, and an assist canceling switch S2 which the driver touches when the driver wants to cancel parking assist in midstream are displayed on the screen of the monitor 4. The parking assist is started by touching the determining switch S1, and the parking assist is canceled by touching the assist canceling switch S2.

Further, as shown in FIG. 1, automatic steering means 6 and a starter switch 7 for switching ON/OFF of parking assist mode are connected to the parking assist ECU 2. The automatic steering means 6 is provided with an actuator for steering a steering wheel of the vehicle, and receives a control signal from the parking assist ECU 2 to steer the steering wheel. Also, the starter switch 7 is mounted on, for example, the instrument panel. In a state where the starter switch 7 is ON, when an assist start condition is established, that is, for example, when the shift lever (not shown) is put into the reverse range, a mode is switched to the parking assist mode to start certain processing of the parking assist. Alternatively, in a state where the starter switch 7 is OFF, even when the shift lever is put into the reverse range and the assist start condition is established, the mode is not switched to the parking assist mode and the processing of the parking assist is not executed. Therefore, for example, when the driver is skilled enough and does not need to use such parking assist device 1, the starter switch 7 may remain OFF.

Also, a vehicle speed sensor and a steering angle sensor 9 are connected to the parking assist ECU 2. The vehicle speed sensor includes, for example, an active wheel speed sensor which is mounted on a wheel (not shown) of the vehicle, and detects a rotational speed of the wheel to output a speed signal to the parking assist ECU 2. In the parking assist signal ECU 2, a mileage of the vehicle is calculated based on the speed signal output from the vehicle speed sensor. Also, the steering angle sensor 9 is mounted on, for example, a steering shaft (not shown) of the vehicle, detects a rotation angle of a steering, and outputs a detected rotation angle signal to the parking assist ECU 2. In the parking assist ECU 2, a steering angle of the steering wheel is calculated based on the detected rotation angle signal of the steering.

An operation of the parking assist device according to the embodiment will be explained, as follows.

Figure 3:
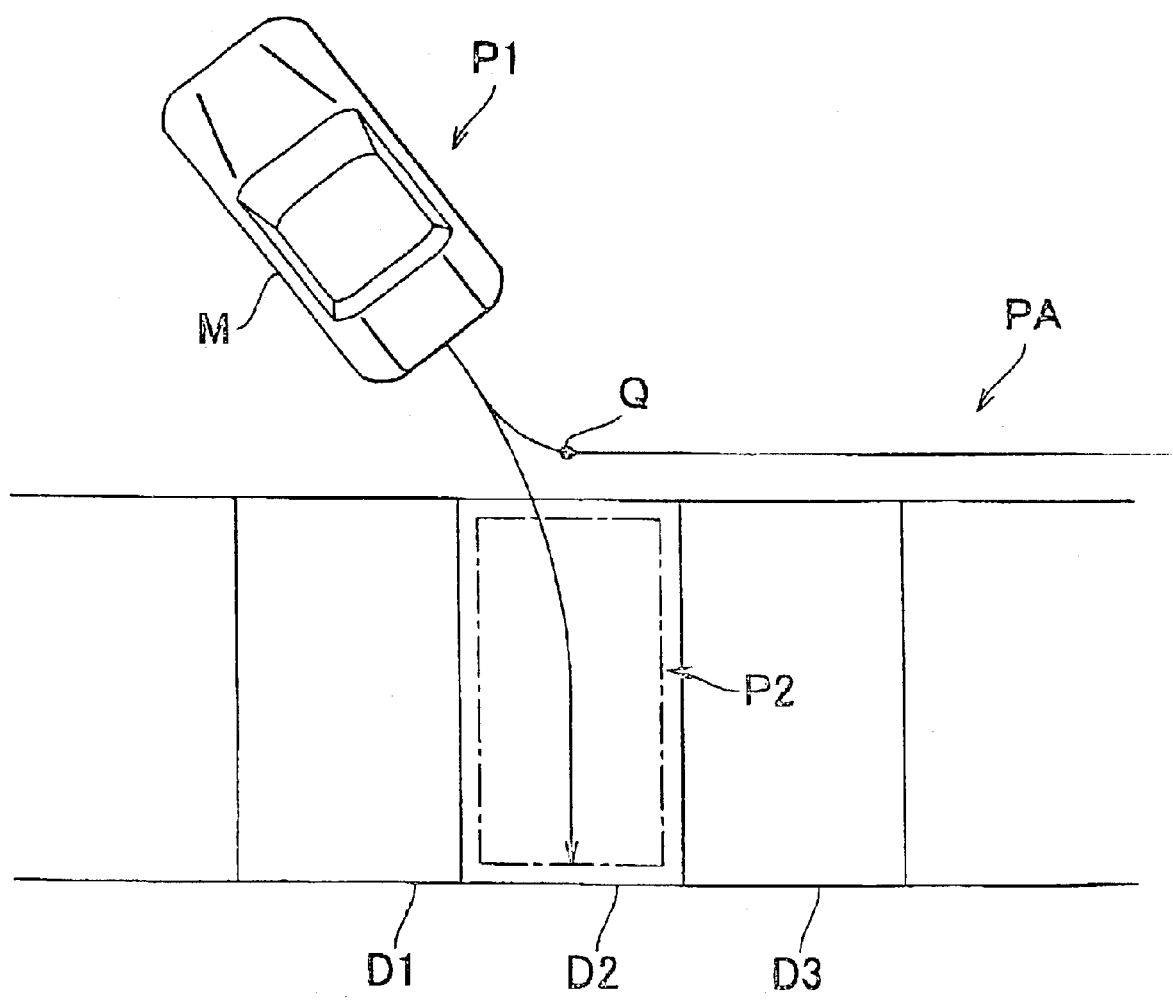
FIG. 3 is a plane view showing a state in which the vehicle moves to a target parking area.

In the embodiment, as shown in FIG. 3, an example in which a vehicle M is parked into a parking section D2 of a parking lot PA whose area for parking vehicles is partitioned into parking sections D1, D2, D3, . . . by a partitioning line will be explained.

In a state where the starter switch 7 is ON, when a driver of the vehicle M, with the intention of parking the vehicle into the parking section D2, passes in front of the target parking position, turns the vehicle such that a rear portion of the vehicle M faces the parking section D2 to move the vehicle M to a parking preparation position P1, and puts the shift lever (not shown) in a vehicle compartment into the reverse range, the mode is switched to the parking assist mode. When the mode is switched to the parking assist mode, the camera 3 is turned ON first, and an image of an area in back of the vehicle is read by the camera 3. The image read by the camera 3 is output to the monitor 4 through the parking assist ECU 2, and displayed on the screen of the monitor 4, as shown in FIG. 2. When the image is displayed on the screen of the monitor 4, a target parking position P2, shown in FIG. 3, in a longitudinal rectangular shape which is corresponding to a form obtained when the vehicle M is seen from the top is set.

In order to set the target parking position P2, a target parking frame 11 is displayed at a default display position on the screen of the monitor 4 first. The driver touches the arrows Y1 to Y6 in the target parking position setting means 5 as required while looking at the target parking frame 11, to move the target parking frame 11, and ultimately set the target parking position P2. In the embodiment, when the default position of the target parking frame 11 at this time is determined, a computation for estimating the target parking position P2 (a relative position with respect to the parking preparation position P1) is executed, and the default position of the target parking frame 11 is determined based on the estimated target parking position P2. The target parking position P2 is estimated based on a running state of the vehicle which is obtained before the vehicle M reaches the parking preparation position P1.

When the parking operation is executed, a behavior of the vehicle M before reaching the parking preparation position P1 is usually as shown in FIG. 3. First the vehicle M comes close to a position in front of the parking section D2 where the driver intends to park the vehicle, while moving straight ahead. A moving direction of the vehicle M at this time is usually along a width direction of the parking section D2. Secondary, the vehicle M passes in front of the parking section D2. At this time, from a starting point Q which is at a front position of the parking section D2, the vehicle M turns and moves, for example, in a clockwise direction to the parking preparation position P1 while proceeding in a direction of moving away from the parking section D2 by a certain deflection angle (a turning round angle with respect to an immediately preceding direction of moving straight) with a certain turning radius. Next, the vehicle M turns and moves while backing up in the clockwise direction with the certain turning radius. Then, the vehicle M finally straight backs up to the target parking position P2.

The target parking position P2, which is a relative position with respect to the parking preparation position P1, is estimated based on a running state (a track of the vehicle) by such a regular backing of a vehicle into a garage. More specifically, the target parking position P2 is estimated as follows; assuming that the vehicle M moves straight and turns around so as to execute such a regular parking as mentioned above when the vehicle M moves to the parking preparation position P1, a deflection angle θ (refer to FIG. 4) of the vehicle M is determined from the moving distance and the turning radius of the vehicle, while the vehicle is turning. The moving distance is determined based on a signal from the vehicle speed sensor, and the turning radius is determined from an amount of steering of the steering wheel which is determined based on a signal from the steering angle sensor 9.

In this case, assuming that a minute moving distance and the turning radius of the vehicle M while the vehicle is turning are respectively ds and R, the deflection angle θ is determined by a following formula (1).

$$\theta = \int_{-5.0}^{0} 1/R \cdot ds \qquad (1)$$

In the formula (1), an integration interval is −5 to 0 m. A variation of a direction of the vehicle which is caused by the vehicle's moving by 5 m until the vehicle reaches the present position is determined by the formula. The moving distance, i.e., 5 m may be changed in accordance with a vehicle speed as required. Also, the parking assist ECU 2 executes a straight judgement. When it is judged that the vehicle M has moved straight as a result of the straight judgement, the deflection angle θ, which is determined by the formula (1), is cleared. In the straight judgement, for example, when the vehicle has run for 2 m, for example, with a steering maintained substantially straight (a steering angle of the steering is within ±30 degrees), it is judged that the vehicle has run straight. Therefore, when the vehicle moves straight before starting turning, the deflection angle θ is accurately determined.

Figure 4:
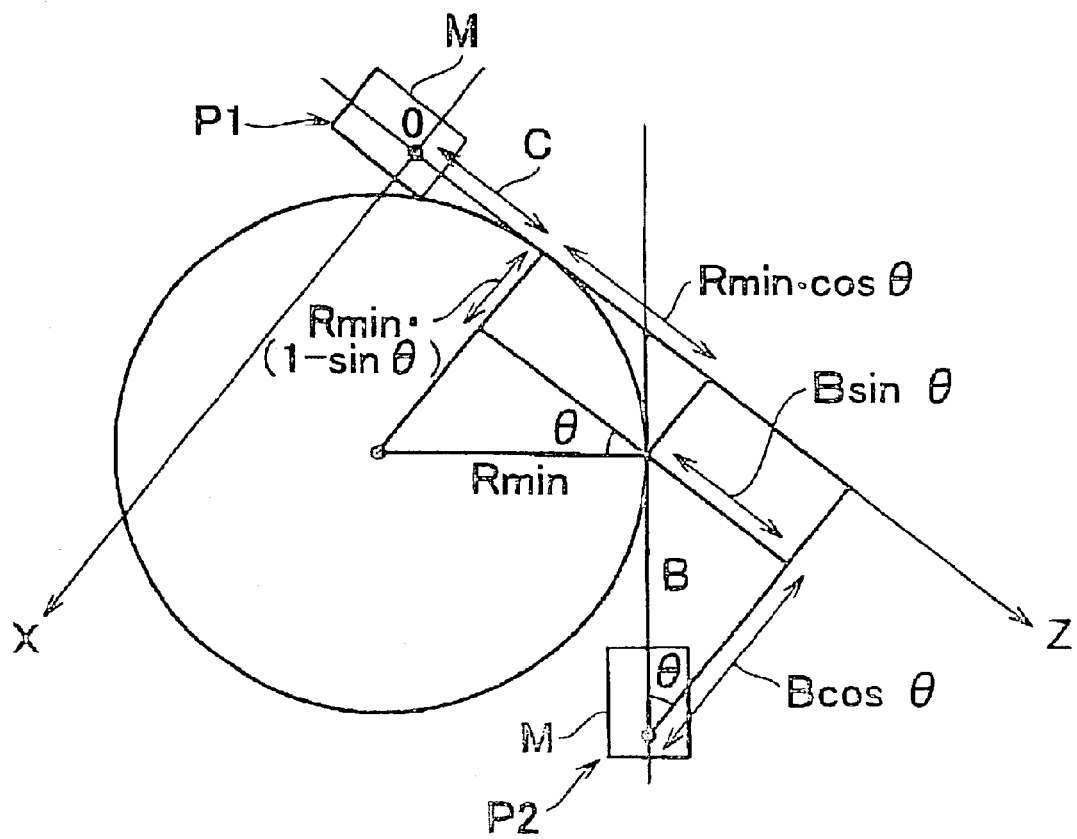
FIG. 4 is an explanatory view explaining the target parking position which is a relative position with respect to a parking preparation position.

After the deflection angle θ is determined, the target parking position P2 (φ1, X1, Z1) is determined in an X-Y coordinate system whose X-axis and Z-axis are respectively a lateral direction and a longitudinal direction of the vehicle M with respect to a position of the vehicle M, as shown in FIG. 4. In this case, φ is an angle of moving toward a direction of turning, which is obtained when the vehicle M executes the parking operation. Also, a coordinate system in which the target parking position P2 (φ1, X1, Z1) is shown is referred to as a road coordinate system. Formulas for calculating the target parking position P2 (φ1, X1, Z1) vary depending on degrees of the deflection angles θ.

First, when the deflection angle θ is equal to or larger than 0 and less than 30 degrees ($0 \leq \theta < 30$), an amount φ1 of moving in the turning direction, an amount X1 of moving in the X direction, and an amount Z1 of moving in the Z direction are determined by following formulas (2) to (4).

$$\phi 1 = 90° - \theta \qquad (2)$$

$$X1 = R\min \cdot (1.0 - \sin \theta) + B \cdot \cos \theta \qquad (3)$$

$$Z1 = C + R\min \cdot \cos \theta + B \cdot \sin \theta \qquad (4)$$

Note that following are adaptation constants; Rmin=4.05 (m), B=2.0 (m), C=1.0 (m).

When the vehicle is backed into the garage, the track of the vehicle can usually be set on the assumption that first the vehicle backs up straight, then moves back while turning, and backs up straight again. The adaptation constant B corresponds to the vehicle's last straight backing up, and the adaptation constant C corresponds to the vehicle's first straight backing up so as to obtain such a track. Also, the adaptation constant Rmin is a turning radius which is obtained when the vehicle backs up while turning, and, for example, a turning radius which is obtained when steering is made to the fullest extent. These adaptation constants are set based on an entire length, a full width, a wheel base, other features, or the like of the vehicle M, as required.

When the vehicle moves, a moving amount in the X direction at the time of first straight backing up is 0, a moving amount in the X direction at the time of backing up while turning around is Rmin·(1.0−sin θ), and a moving amount in the X direction at the time of last straight backing up is B·cos θ. Therefore, as a moving amount X1 in the X direction, the formula (3) is derived by adding these values. Also, a moving amount in the Z direction at the time of first straight backing up is C, a moving amount in the Z direction at the time of backing up while turning is Rmin·cos θ, and a moving amount in the Z direction at the time of last straight backing up is B·sin θ. Therefore, as a moving amount Z1 in the Z direction, the formula (4) is derived by adding these values together.

Note that when the deflection angle θ is 0 degree (θ=0), it is preferable to set in advance whether a target parking frame 11 is displayed on a right side or a left side of the vehicle on the screen of the monitor based on whether the vehicle M is parked on a right rear side or a left rear side, since the vehicle M does not turn around.

Secondly, when the deflection angle θ is equal to or larger than 30 degrees and less than 50 degrees ($30 \leq \theta < 50$), a moving amount $\phi1$ in the turning direction and a moving amount X1 in the X direction can be determined by the formula (2) and the formula (3) as well as in the case where the deflection angle is equal to or larger than 0 degree and less than 30 degrees. Also, an moving amount Z1 in the Z direction can be determined by the following formula (5).

$$Z1=5.5+0.05\cdot(\theta-30) \qquad (5)$$

When the deflection angle $\theta$ is equal to or larger than 30 degrees, the moving amount Z1 in the Z direction increases proportionately with the deflection angle $\theta$. Accordingly, within a range where the deflection angle $\theta$ is equal to or larger than 30 degree and less than 50 degrees, the moving amount Z1 in the Z direction linearly increases in accordance with increases in the deflection angle $\theta$, as shown by the formula (5).

In addition, when the deflection angle $\theta$ is equal to or larger than 50 degrees ($50 \leq \theta$), the moving amount $\phi1$ in the turning direction and the moving amount X1 in the X direction can be determined by the formula (2) and the formula (3) as in the case where the deflection angle $\theta$ is equal to or larger than 0 degree and less than 30 degrees. Also, the moving amount Z1 in the Z direction can be determined by a following formula (6).

$$Z1=6.5 \qquad (6)$$

When the vehicle is backed to the garage, the deflection angle $\theta$ is usually approximately 20 degrees, and even when the deflection angle $\theta$ is large, it is approximately 30 degrees. Also, when the deflection angle $\theta$ increases to equal to or larger than 50 degrees, there is almost no variations in the moving amount in the Z direction. The target parking position P2 ($\phi1$, X1, Z1) which is a relative position with respect to the parking preparation position P1 can be estimated with substantially high accuracy by fixing the moving amount Z1 at 6.5 m and defining a maximum value.

After the target parking position P2 is estimated in the above-mentioned manner, the default display position of the target parking frame 11 is determined based on the estimated target parking position P2. So far, a relation between the parking preparation position P1 and the target parking position P2 has been explained in the road coordinate system. However, a conversion from the road coordinate system to a monitor coordinate system is required in order to display the target parking frame 11 on the screen of the monitor 4 based on the target parking position P2. Therefore, a conversion from the target parking position P2 in the road coordinate system to the default display position of the target parking frame 11 in the monitor coordinate system will be explained as follows.

First, coordinates of four points (points corresponding to four corners of the target parking frame 11) positioned at vertexes of the target parking position are determined based on the target parking position P2 ($\phi1$, X1, Z1) in the road coordinate system which is determined in the above-mentioned manner. Secondary, positions of first midpoints of the target parking position P2 are determined based on the coordinates of these vertex portions. Then, positions of second midpoints between each first midpoint and each vertex are determined, and positions which quarter a distance between each vertex are determined. Namely, three midpoints are determined between each vertex, and 12 midpoints are determined in total.

The coordinates of the four vertexes and the 12 midpoints determined in the above-mentioned manner are converted from the road coordinate system into the monitor coordinate system by a certain computing equation. At this time, only a position of an eye point is converted, and distortion of lens is not added. Then, the target parking frame 11 is displayed at the default display position by adding the distortion of lens to the coordinate in the monitor coordinate system in accordance with the distortion of lens, determining four vertexes and 12 midpoints, and connecting the four vertexes such that each side of the frame passes through these midpoints as required.

When the target parking frame 11 is displayed at the default display position on the screen of the monitor 4 in the above-mentioned manner, the driver touches the arrows Y1 to Y6 in the target parking position setting means 5 as required to modify the position of the target parking frame 11 and set the target parking position. The target parking frame 11 is displayed in the vicinity of the target parking position P2 at this time, which reduces a setting time when the driver sets the target parking position P2.

When the target parking position P2 is set, the parking assist ECU 2 judges whether a track from the parking preparation position P1 to the target parking position P2 can be drawn based on a relative positional relation between the parking preparation position P1, which is a current position of the vehicle M, and the set target parking position P2. Then, when the parking assist ECU 2 judges that the track cannot be drawn, it displays the target parking frame 11 in red as well as displaying a comment "guidance is not available" on the screen of the monitor 4. On the contrary, when the parking assist ECU 2 judges that the track can be drawn, it displays the target parking frame 11, for example, in green which is different from red as well as displaying a determining switch S1 on the screen of the monitor 4. At this time, the target parking frame 11 is displayed at a position corresponding to the target parking position P2 on the screen of the monitor 4, and a traveling track 12 of the vehicle until the vehicle reaches the target parking frame 11 is displayed on the screen of the monitor 4. The driver can confirm a route which the vehicle M takes from now by visually checking the traveling track 12. Also, when there is an obstacle or the like on the route, the driver can move the vehicle from the parking preparation position P1 by touching an assist canceling switch S2 to cancel the parking assist. Alternatively, when there is no obstacle or the like on the route, and the drivers judges that parking is possible, the parking assist is started by touching the displayed determining switch S1, without touching the assist canceling switch S2.

When the parking assist is started, the automatic steering means 6 is activated, which enables the driver to execute the parking operation with the parking assist by adjusting a vehicle speed as required, without operating the steering. During the execution of the parking assist, since the target parking frame 11 is continuously displayed on the screen of the monitor 4, the driver can execute the parking operation while confirming that the vehicle is moving toward target parking frame 11 on the screen of the monitor 4.

There is a possibility that the parking assist is canceled because the vehicle stops or the like by fulfilling the assist canceling condition against the driver's will. This may be caused when the vehicle runs onto a curbstone or the like. In such a case, the driver usually needs to reset the target parking position P2 in order to restart the parking assist. In the embodiment, when the target parking position P2 is reset, the target parking frame 11 determined based on the previous target parking position P2 and the running state of the vehicle from when the parking assist is started until when the parking assist is canceled is displayed as a default display on the screen of the monitor 4. In such a case where the parking assist is canceled against the driver's will, the vehicle M usually does not deviate from the traveling track. In such a case, the target parking frame 11 can be displayed without deviating from the reset target parking position P2 by displaying the target parking frame 11 which is determined in the above-mentioned manner as the default display on the screen of the monitor 4. This eliminates the driver having to re-execute a setting operation of the target parking position P2, or saves the driver the trouble of executing the setting operation.

Figure 5:
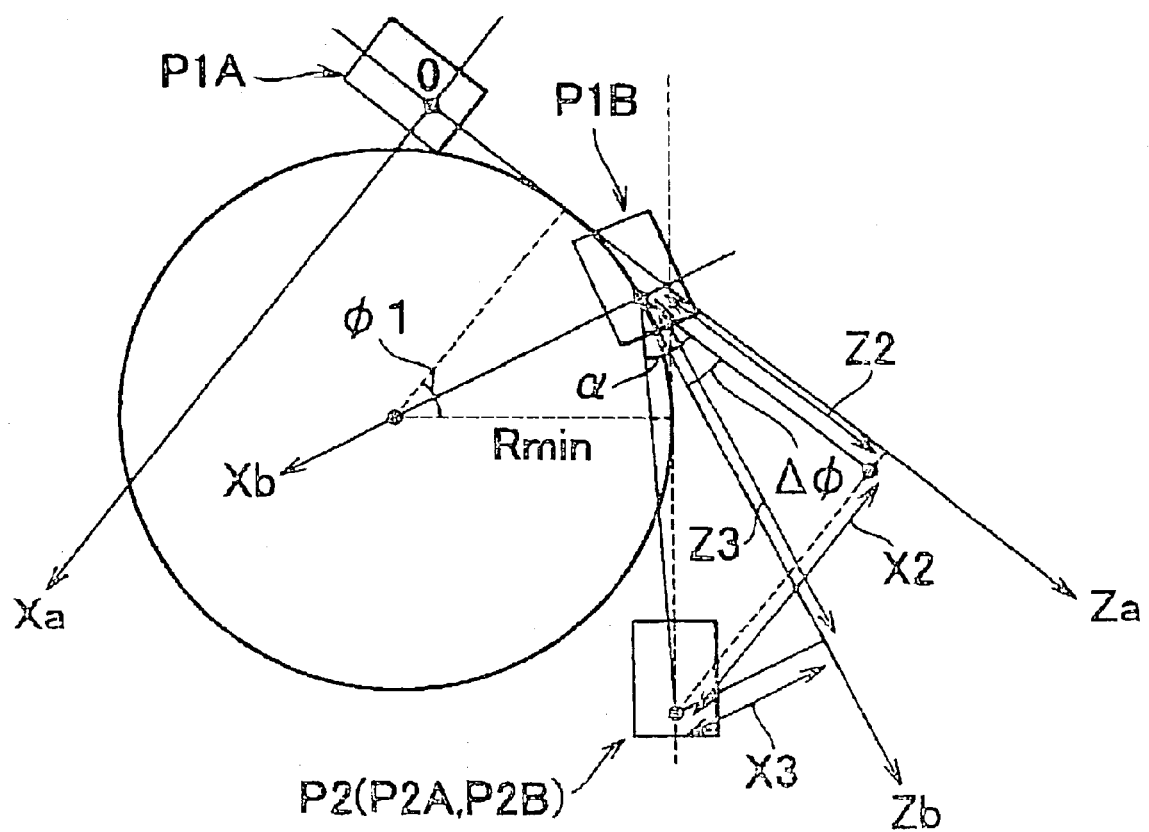
FIG. 5 is an explanatory view explaining a relation between the target parking position and a reset position at which the target parking position is reset.

Hereafter, procedures of resetting the target parking position will be explained mainly with reference to FIG. 5. When the target parking position P2 which is set prior to the restart time of the parking assist is displayed as the default display position of the target parking frame 11 (FIG. 2) at the restart time of the parking assist, a position to which the target parking frame 11 is moved by a moving amount from the target parking position P2A which is set at the start time of the parking assist to the target parking position P2B which is set at the restart time of the parking assist may be the default display position of the target parking frame 11 at the reset time. In FIG. 5, the parking preparation position that is a position at which the target parking position is set first is shown as P1A, and the coordinate system with respect to the parking preparation position P1A is shown as a Xa–Za coordinate system. Also, a position at which the target parking position is reset is shown as P1B, and the coordinate system with respect to the reset position P1B is shown as Xb–Zb. Also, the target parking position in the Xa–Za coordinate system is shown as P2A, and the target parking position in the Xb–Zb is shown as P2B. Note that the target parking positions P2A, P2B are shown at an agreed position in FIG. 5.

As shown in FIG. 5, referring to a moving angle of turning direction of the vehicle M as $\Delta\phi$, a moving amount of the vehicle M in a direction of an axis Xa as $\Delta X$, and a moving amount of the vehicle M in a direction of an axis Zb as $\Delta Z$ respectively, a moving amounts ($\Delta\phi$, $\Delta X$, $\Delta Z$) of the vehicle M from the parking preparation position P1A to the reset position P1B are respectively determined by the following formulas (7) to (9).

$$\theta = \int_{-\beta}^{0} 1/R \cdot ds \qquad (7)$$

$$\Delta X = \int_{-\beta}^{0} \sin\theta \cdot ds \qquad (8)$$

$$\Delta Z = \int_{-5.0}^{0} \cos\theta \cdot ds \qquad (9)$$

In this case, an integral interval $-\beta$ to 0 is a moving distance of the vehicle from the parking preparation position P1A to the parking assist cancellation position (reset position P1B).

The target parking position P2B ($\phi 2$, X2, Z2) at the reset time is determined based on the moving amount ($\Delta\phi$, $\Delta X$, $\Delta Z$) determined by the formulas (7) to (9), and the target parking position P2 ($\phi 1$, X1, Z1) determined at the parking preparation position P1A which is determined by the formulas (2) to(6), by the following formulas (10) to (12).

$$\phi 2 = \phi 1 - \Delta\phi \qquad (10)$$

$$X2 = X1 - \Delta X \qquad (11)$$

$$Z2 = Z1 - \Delta Z \qquad (12)$$

Note that the target parking position P2B determined in the above-mentioned manner is a position in the Xa–Za coordinate system with respect to the parking preparation position P1A. Therefore, the target parking position P2B is not a correct value for the vehicle M which is at the reset position P1B. Accordingly, it is necessary to convert the P2B from the Xa–Za coordination system with respect to the parking preparation position P1A to the Xb–Zb coordination system with respect to the reset position P1B, in order to determine a correct value. Showing the target parking position P2B after the conversion by coordinate points ($\phi 3$, X3, Z3), the target parking position P2B ($\phi 3$, X3, Z3) are respectively determined by the following formulas (13) to (16).

$$\phi 3 = \phi 2 \qquad (13)$$

$$X3 = \sqrt{X2^2 + Z2^2} \cdot \sin(\alpha - \Delta\phi) \qquad (14)$$

$$Z3 = \sqrt{X2^2 + Z2^2} \cdot \cos(\alpha - \Delta\phi) \qquad (15)$$

$$\alpha = \cos^{-1}(Z2/\sqrt{X2^2 + Z2^2}) \qquad (16)$$

The target parking frame 11 can be displayed at a substantially accurate position by converting the target parking position P2B ($\phi 3$, X3, Z3), which is determined in the above-mentioned manner, from the road coordinate system to the monitor coordinate system, and using the converted position as the default display position of the target parking frame 11. The target parking frame 11 displayed at the default display position corresponds to the target parking position P2, or even when the target parking frame 11 deviates from the target parking position P2, an amount of deviation is minute. Accordingly, when setting the target parking position P2 at the restart time of the parking assist, the driver does not need to move the target parking frame 11, or even when the driver needs to move the target parking frame 11, the moving amount may be minute. This saves the driver the trouble of setting the target parking position P2. Thus, the time required to set the target parking position may be eliminated or reduced.

Also, the parking assist device 1 according to the embodiment executes different processing depending on whether or not the parking assist is restarted by judging whether the parking assist is restarted or not. Hereafter, an operation thereof will be explained with reference to a flow chart shown in FIG. 6.

In the parking assist device, first, whether a parking assist control is ON is judged (S1). When it is judged that the parking assist control is ON, then whether the parking assist control is completed or not is judged (S2). Then, if the parking assist control is completed, the parking assist device judges that the parking assist control is OFF and does not execute the parking assist (S8). If the parking assist control is not completed, the parking assist device judges that the parking assist control is ON, and continues the parking assist control (S7).

Also, in step S1, when it is judged that the parking assist control is OFF, then whether the parking assist control is being suspended or not is judged (S3). Whether the parking assist control is being suspended or not can be judged, for example, by detecting a time elapsed since the vehicle M stopped after the vehicle M had started backing up by putting the shift lever of the vehicle M into the reverse range. At this time, if it is judged that the parking assist control is being suspended, whether the parking assist control is restarted or not is judged (S4). A determination on whether the parking assist control has been restarted can be effected, for example, as follows. That is, a restart switch is displayed on the monitor while the parking assist operation is being suspended and it is determined that the parking assist control has been restarted when the switch has been touched.

Then, when the parking assist control is a restarted one, the default display position of the target parking frame 11 is determined by the formulas (7) to (16) based on the target parking position P2 which is set prior to the restart, as mentioned above (S5). Then, the driver moves the target parking frame 11 displayed at the default display position by touching the arrows Y1 to Y6 in the target parking position setting means 5 as required (S6). After this, the target parking position P2 is established by touching the determining switch S1. However, at this time, the default display position of the target parking frame 11 substantially corresponds to a position corresponding to the target parking position P2, as mentioned above, which usually makes an adjustment operation unnecessary. Then, the parking assist control is turned ON by the driver's touching the determining switch S1 (S7), and the parking assist control is continued. Also, when it is judged that the parking assist control is not restarted, the parking assist control is turned OFF (S8), and the parking assist control is not executed.

Meanwhile, when it is judged that the parking assist control is not being suspended in step S3, whether the parking assist control is started is judged (S9). Whether the parking assist control is started or not can be judged by, for example, detecting whether the shift lever is put into the reverse range or not, as mentioned above. When it is judged that the parking assist control is started, the target parking position P2 is estimated, for example, based on the running state which is detected before the vehicle M reaches the parking preparation position P1, as mentioned above, and the default display position of the target parking frame 11 is determined by the formulas (1) to (6) based on the estimated target parking position P2 (S10). The target parking frame 11 is displayed at the determined default display position, and then the driver moves the target parking frame 11 displayed at the default display position as required by touching the arrows Y1 to Y6 in the target parking position setting means 5 to modify the target parking frame 11 (S11). Then, the target parking position P2 is established by touching the determining switch S1. After this, the parking assist control is turned ON by the driver's touching the determining switch S1 (S7), and the parking assist control is continued. Alternatively, when it is judged that the parking assist control is not started in step S9, the parking assist control is turned OFF (S8), and the parking assist control is not executed.

As mentioned above, at the restart time of the parking assist, the target parking frame 11 can be displayed as the default display at a position corresponding to the target parking position P2 with high accuracy by judging whether the currently executed parking assist is the restarted parking start or not.

While the preferred embodiment of the invention has been explained, the invention is not limited to the above-mentioned embodiment. For example, in the above-mentioned embodiment, the target parking position which is set first is exemplified as a target parking position which is set prior to the restart of the parking assist. However, for example, when the parking assist has restarted twice or more, the target parking position which is set most recently may be the target parking position which is set prior to the restart of the parking assist. As a matter of course, when the parking assist has been restarted twice or more, the target parking position which is set first may be the target parking position set prior to the restart of the parking assist.

Also, in the embodiment, automatic steering means is provided. However automatic braking means or automatic driving means in addition to the automatic steering means may be provided such that the driver can execute the parking operation without executing a vehicle speed adjustment operation. As a matter of course, one or two of the above-mentioned means may be provided such that the driver can execute the parking assist.

As explained above, according to the embodiment, when the parking assist is cancelled during the parking assist execution because the vehicle stops or the like, and the parking assist is restarted, the target parking position can be easily set, which enables an early start of the parking assist after the restart.

What is claimed is:

1. A parking assist device which is provided with image capturing means for capturing an image of an area outside a vehicle, and displaying means for displaying both a captured image and a target parking frame on a screen of the displaying means to assist a parking operation executed by a driver of the vehicle comprising:

when a parking assist is canceled after a start of the parking assist, and the parking assist is restarted, the parking assist device determines a target parking position at a restart time of the parking assist based on a target parking position set prior to the restart time of the parking assist, and displays the determined target parking position on the screen of the displaying means as a default display position of the target parking frame at a reset time; and a moving amount of the vehicle obtained from when the target parking position is set prior to the restart time of the parking assist until when the parking assist is restarted is determined, and the target parking position at the restart time is determined by moving the target position set prior to the restart by the moving amount of the vehicle.

2. The parking assist device according to claim 1, wherein the target parking frame determined based on the target parking position at the restart time is displayed as a default display on the screen.

3. The parking assist device according to claim 2, wherein the parking assist device further comprise restart judging means for judging whether a setting of the target position is a selling of the target parking position at the restart time, and the target parking frame is displayed as the default display on the screen when the setting of the target parking position is judged as the target parking position at the restart time by the restart judging means.

4. The parking assist device according to claim 3, wherein the target parking frame determined based on the target parking position at the restart time is displayed as a default display on the screen.

5. The parking assist device according to claim 3, wherein the target parking frame is displayed on the screen during execution of the parking assist.

6. The parking assist device according to claim 2, wherein the target parking frame is displayed on the screen during execution of the parking assist.

7. The parking assist device according to claim 1, wherein the target parking frame is displayed on the screen during execution of the parking assist.

8. The parking assist device according to claim 7, further comprising:

target parking position selling means which includes a portion operated by a driver of the vehicle so as to move the target parking frame displayed on the screen, and a portion operated by the driver so as to set the displayed target parking frame as the target parking position.

9. A method for assisting a parking operation by displaying an image captured by image capturing means of a vehicle and a target parking position on a screen of displaying means provided inside the vehicle comprising:

when a parking assist is canceled after a start of the parking assist, and the parking assist is restarted, determining a target parking position at the restart time based on a target parking position which is set prior to the restart time of the parking assist, and displaying the determined target parking position on the screen of the displaying means as a default position of the target parking frame at a reset time;

determining a moving amount of the vehicle obtained from when the target parking position is set prior to the restart time of the parking assist until when the parking assist is restarted; and determining the target parking position at the restart time by moving the target position set prior to the restart by the moving amount of the vehicle.

10. A parking assist device which is provided with image capturing means for capturing an image of an area outside a vehicle, and displaying means for displaying both a captured image and a target parking frame on a screen of the displaying means to assist a parking operation executed by a driver of the vehicle comprising:

when a parking assist is canceled after a start of the parking assist, and the parking assist is restarted, the parking assist device determines a target parking position at a restart time of the parking assist based on a target parking position set prior to the restart time of the parking assist, and displays the determined target parking position on the screen of the displaying means as a default display position of the target parking frame at a reset time;

the target parking frame determined based on the target parking position at the restart time is displayed as a default display on the screen;

the parking assist device further comprises restart judging means for judging whether a setting of the target position is a setting of the target parking position at the restart time, and the target parking frame is displayed as the default display on the screen when the setting of the target parking position is judged as the target parking position at the restart time by the restart judging means.

11. The parking assist device according to claim 10, wherein the target parking frame is displayed on the screen during execution of the parking assist.

12. The parking assist device according to claim 10, further comprising:

target parking position setting means which includes a portion operated by a driver of the vehicle so as to move the target parking frame displayed on the screen, and a portion operated by the driver so as to set the displayed target parking frame as the target parking position.

* * * * *